Jan. 29, 1957  M. P. CLARK ET AL  2,779,255
METHOD OF AND APPARATUS FOR MANUFACTURI.
VACUUM CLEANER DUST CONTAINERS
Filed Sept. 18, 1953  11 Sheets-Sheet 10

INVENTORS
Murray P. Clark
Emil Anderson
BY Thomas L. Betts
ATTORNEY

United States Patent Office 2,779,255
Patented Jan. 29, 1957

2,779,255

METHOD OF AND APPARATUS FOR MANUFACTURING VACUUM CLEANER DUST CONTAINERS

Murray P. Clark, Upper Darby, Pa., and Emil Anderson, Briarcliff Manor, N. Y., assignors to Electrolux Corporation, Old Greenwich, Conn., a corporation of Delaware Application September 18, 1953, Serial No. 381,073

14 Claims. (Cl. 93—8)

Our invention relates to a method of and apparatus for manufacturing disposable dust containers for use in vacuum cleaners. A container of this type is shown in Patent No. 2,596,808 issued May 13, 1952, to G. E. Lofgren and includes a flexible bag made of porous flexible paper and formed with a flat end section. This end section is formed with an opening therethrough and a flat disc of relatively stiff material, such as cardboard, is secured thereto by gluing and is formed with an opening in registry with the end portion. The other end of the bag is closed by being folded over and glued.

In accordance with our invention cardboard discs, which have previously been cut to the desired size and shape, including the opening therethrough, are fed in one direction, while partially formed bags are fed in a direction at right angles thereto. Each of these bags has previously been completed to the extent that the flat end portion with the opening therethrough has been formed, but the opposite end of the bag has not been folded over and closed.

These bags are fed in timed relation to the advance of the discs so that the flat end portion of a bag arrives in juxtaposition to a disc, the two, as above stated, traveling at right angles to each other. Thereupon, the direction of travel of the bag is changed so that it is caused to travel parallel to the travel of the disc and the two are then brought together and subjected to pressure so as to adhere the bag to the disc, which previously has had glue applied to it.

Thereafter, the disc and bag assembly continue in the same direction and glue is applied to the outer surface near the open end of the bag and this end is folded over on itself and pressure is applied to cause the glued surfaces to adhere and thus close this end of the bag. If desired, the end may be folded twice, and the glue applied between the first and second folds.

The reason for the change in the direction of travel of the bag is as follows. The bags are symmetrical with respect to their longitudinal axes, but, because of the presence of the flat end portion at one end only, the bags are not symmetrical with respect to their transverse axes. Hence, it would be very difficult to feed the bags laterally from a stack and therefore it is necessary to feed them longitudinally. However, in order to fold over and close the end of the bags, it is necessary that they be traveling laterally during this operation, and consequently a right angle change in the direction of travel is required.

The present invention includes automatic machinery for rapidly carrying out the above briefly outlined process and the details of this machinery as well as further details of the process will be apparent from the following specification when considered in connection with the appended drawings forming part of this application and on which:

Fig. 1b is a top view of the right-hand portion of the apparatus shown in Fig. 1a;

Fig. 2a is a side view of the portion of the apparatus shown in Fig. 1a;

Fig. 16 is a cross-sectional view taken on the line 16—16 of Figs. 1a and 2a;

Fig. 17 is a cross-sectional view taken on the line 17—17 of Fig. 2a;

Referring more particularly to the drawings, reference character 40 designates a longitudinally extending frame of structural steel or the like which is suitably supported from a floor.

Figure 2A:
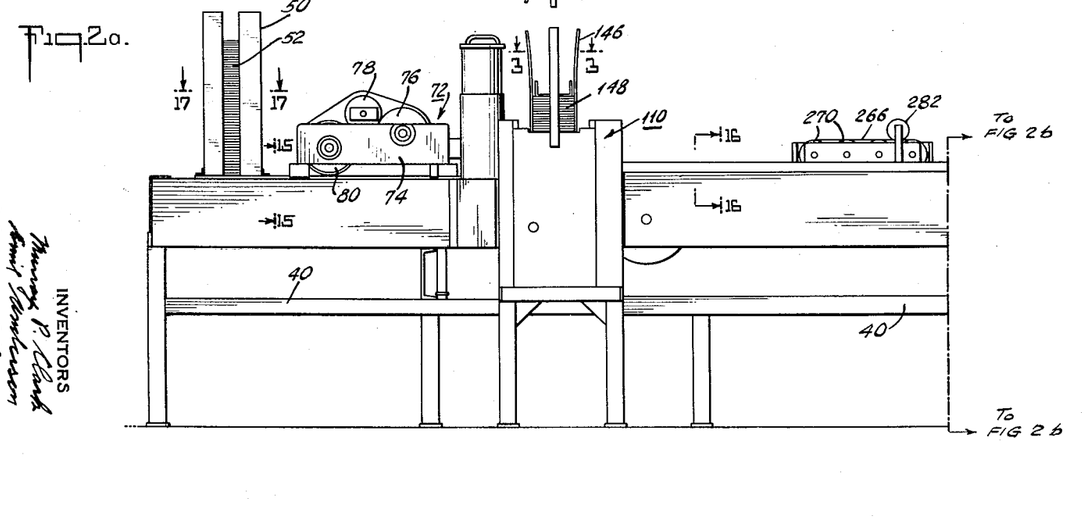
Figure 2B:
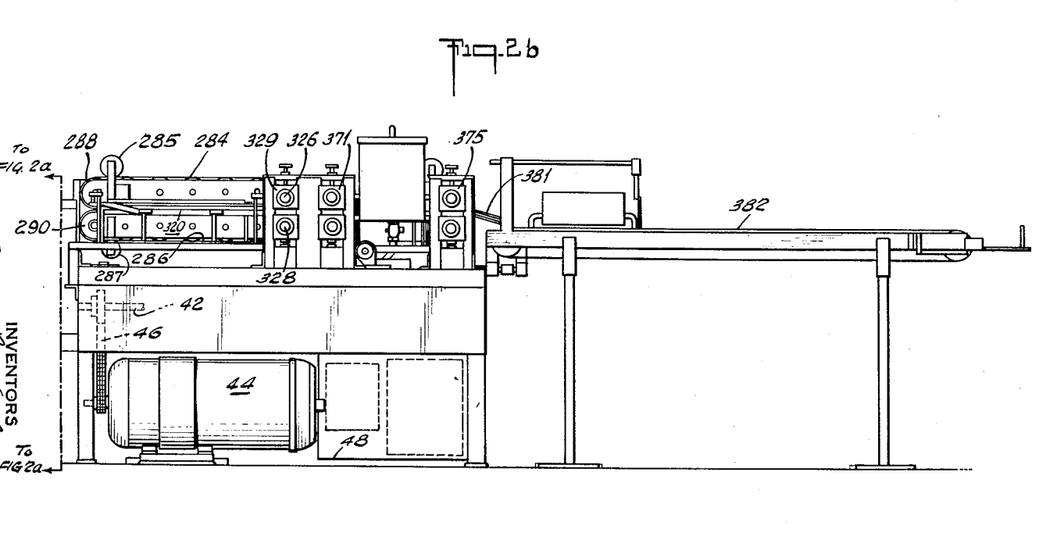
Fig. 2b is a side view of the portion of the apparatus shown in Fig. 1b.
Figure 22:
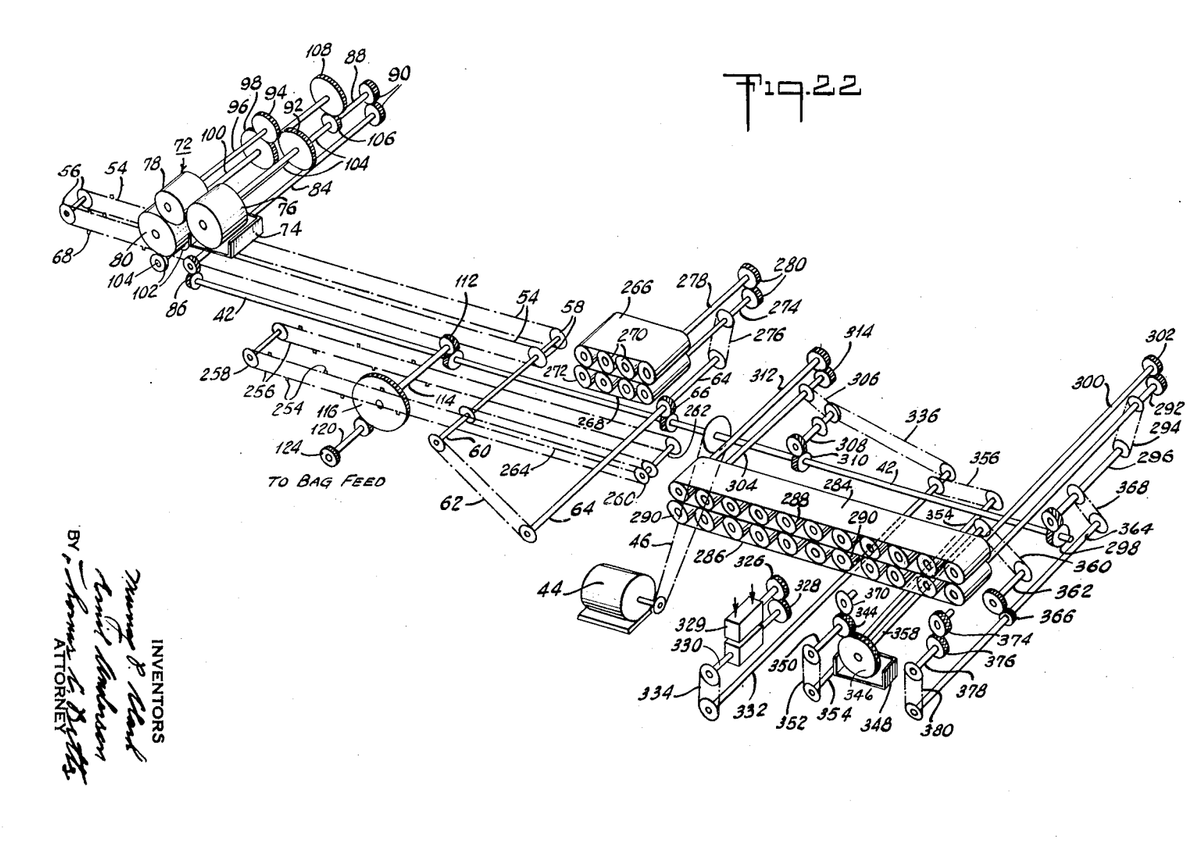
Fig. 22 is a schematic drawing showing the drives of certain of the parts illustrated in the preceding figures.

Extending longitudinally of the frame and supported in suitable bearings is a line shaft 42 driven by an electric motor 44 through a chain and sprocket drive 46 (Figs. 2b and 22). The motor 44 is of the variable speed type and is provided with usual speed control mechanism designated diagrammatically by reference character 48.

Disc feed and glue applicator

Figure 15:
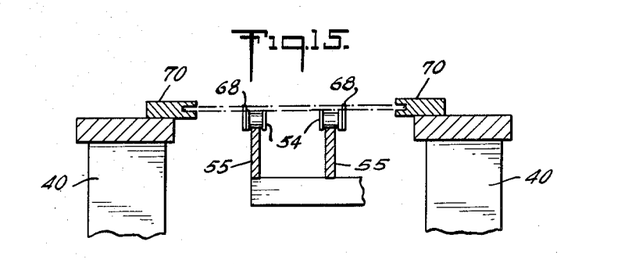
Fig. 15 is a cross-sectional view taken on the line 15—15 of Figs. 1a, 2a and 17.
Figure 16:
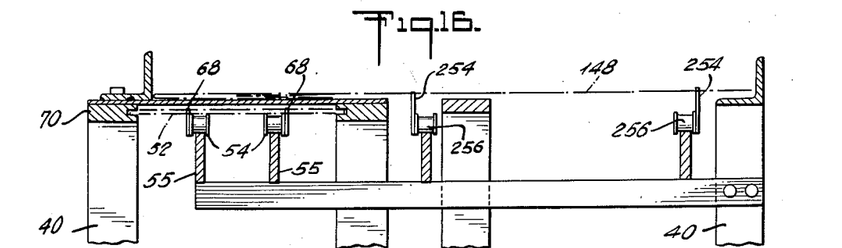
Figure 17:
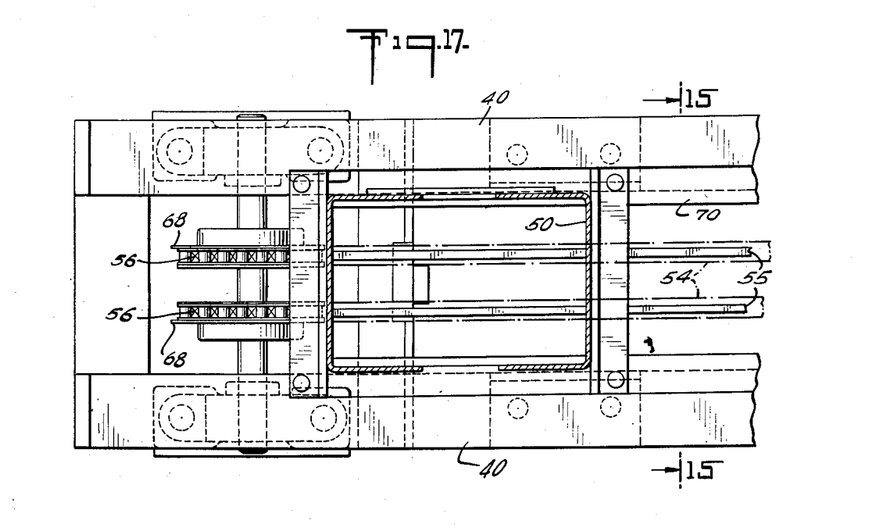
Figure 18:
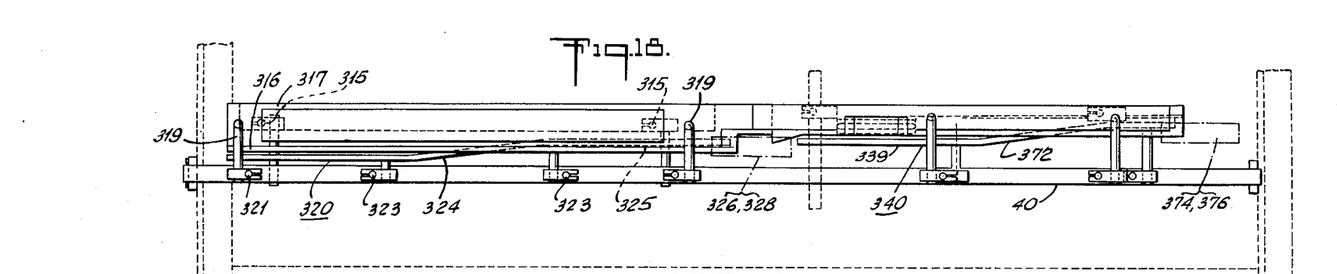
Fig. 18 is a top view of a portion of the apparatus shown in Figs. 1b and 2b.
Figure 23:
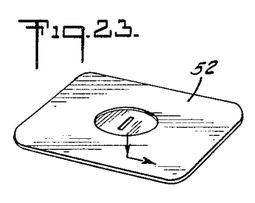
Fig. 23 is a perspective view of a cardboard disc as supplied to the apparatus.

Mounted near the left end of the frame 40 is a magazine or hopper 50 (Figs. 1a, 2a, and 17) for receiving cardboard discs 52 of the type shown in Fig. 23. Disposed beneath the hopper 50 is a pair of conveyer chains 54 running on sprockets 56 and 58. The upper runs of the chains are supported by rails 55 to prevent sagging of the chains between the sprockets. Sprockets 58 are mounted on a shaft 60 which is connected through a chain and sprocket drive 62 having a one to one ratio with a shaft 64 which is driven from the line shaft 42 through a pair of screw gears 66, also having a one to one ratio (Fig. 22). As is shown more particularly in Fig. 15, chains 54 carry upwardly extending projections 68 which extend above the chain a distance equal to the thickness of one of the discs 52 so that the projections will engage and move forward the lowest disc in the hopper 50. Extending parallel and on either side of the pair of chains 54 is a pair of guide rails 70 formed with grooves which receive the longitudinal edges of the discs 52 and guide them as they are conveyed by the chains.

Figure 1A:
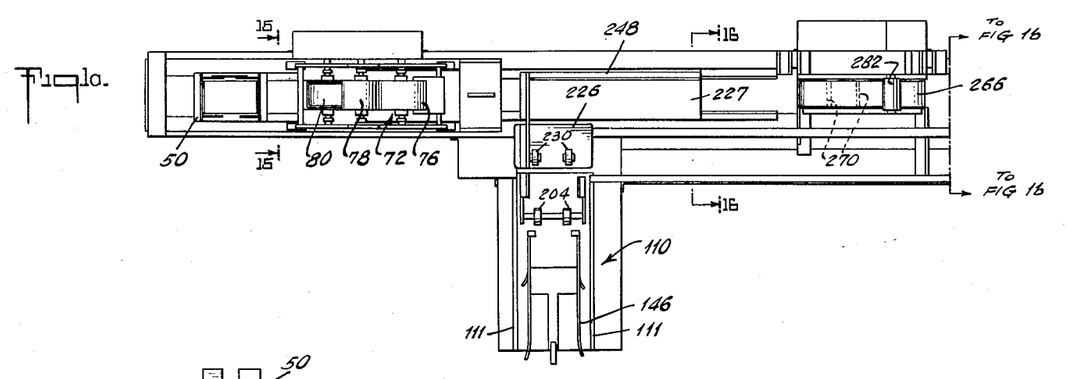
Fig. 1a is a top view of the left-hand portion of the apparatus in accordance with the present invention.
Figures 24, 25:
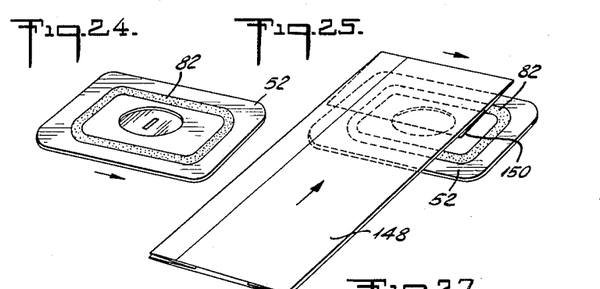
Fig. 24 is a perspective view of the disc shown in Fig. 23 after glue has been applied thereto.
Fig. 25 shows the disc of Fig. 24 after a bag has been brought into juxtaposition therewith.

Mounted on the frame 40 and above the conveyer chains 54 a short distance to the right of the hopper 50 is a glue applying device designated generally by reference character 72 (Figs. 1a, 2a and 22). This device includes a reservoir 74 in which is disposed the lower part of a glue pickup roller 76, the surface of which engages a transfer roller 78 which in turn contacts a glue printing roller 80. The latter roller has a raised portion thereon to which glue is applied by transfer roller 78, this raised portion having a suitable configuration for printing a rectangular line of glue 82, as is shown on the disc 52 in Fig. 24. The rollers 76, 78 and 80 are driven by suitable gearing so that all of the rollers have the same peripheral speed and the same peripheral speed as the linear speed of the discs 52 as conveyed by the chains 54. This gearing is shown diagrammatically in Fig. 22 and includes a shaft 84 driven from the line shaft 42 by means of a pair of screw gears 86, which shaft drives a parallel shaft 88 through a pair of spur gears 90. Pickup roller 76 is mounted on shaft 88 and this shaft also carries a spur gear 92 which meshes with a spur gear 94 on a shaft 96 carrying transfer roller 78, the ratio of gears 92 and 94 being the same as the ratio of the diameters of rollers 76 and 78. Spur gear 94 also meshes with a spur gear 98 carried by a shaft 100 on which is mounted printing roller 80, the ratio of gears 94 and 98 being the same as the ratio of the diameters of rollers 78 and 80. Mounted beneath the print roller 80 and straddling the conveyer chains 54 is a pair of supporting rollers 102 mounted on a shaft 104 which carries a pinion 106 meshing with a pinion 108 mounted on shaft 100 of print roller 80, the ratio of gears 106 and 108 being the same as the ratio of the diameters of rollers 102 and 80, so that the peripheral speeds of these rollers are the same, and the same as the linear speed of the discs as conveyed by the chains 54. The purpose of rollers 102 is to support the discs so that they will not be deformed by the pressure applied to them by the print roller.

Bag feeding mechanism

Disposed to the right of the glue applying mechanism 72 and extending at right angles to the frame 40 is a bag feeding mechanism designated generally by reference character 110 and having a frame 111. Details of this mechanism are shown in Figs. 3 through 14. As is shown particularly in Fig. 5, the bag feeding mechanism is driven from the line shaft 42 through a pair of screw gears 112 which drive a shaft 114 carrying a spur gear 116 which meshes with a spur gear 118 mounted on a shaft 120. This shaft drives a cam shaft 122 through a pair of screw gears 124 and 125.

Figure 5:
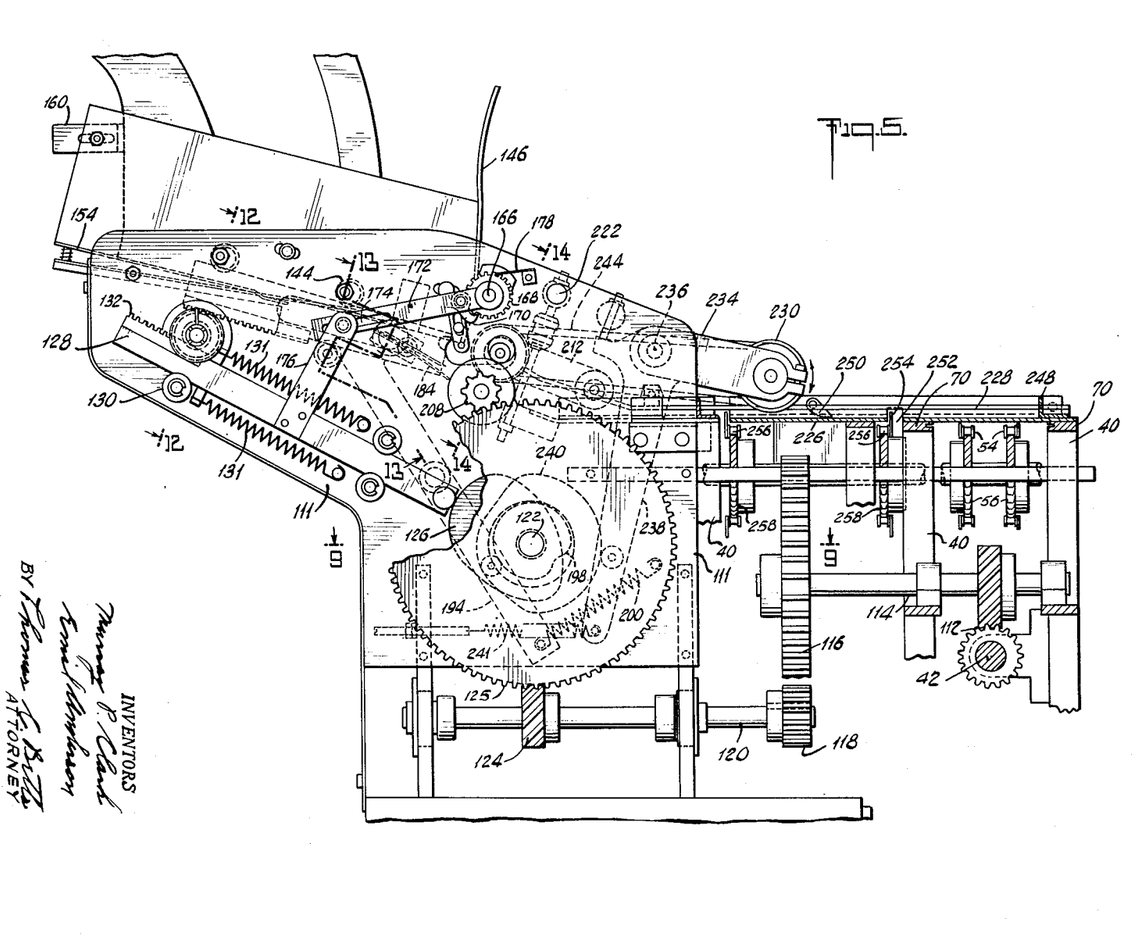
Fig. 5 is a side view of the apparatus shown in Fig. 3.
Figures 6, 7, 8:
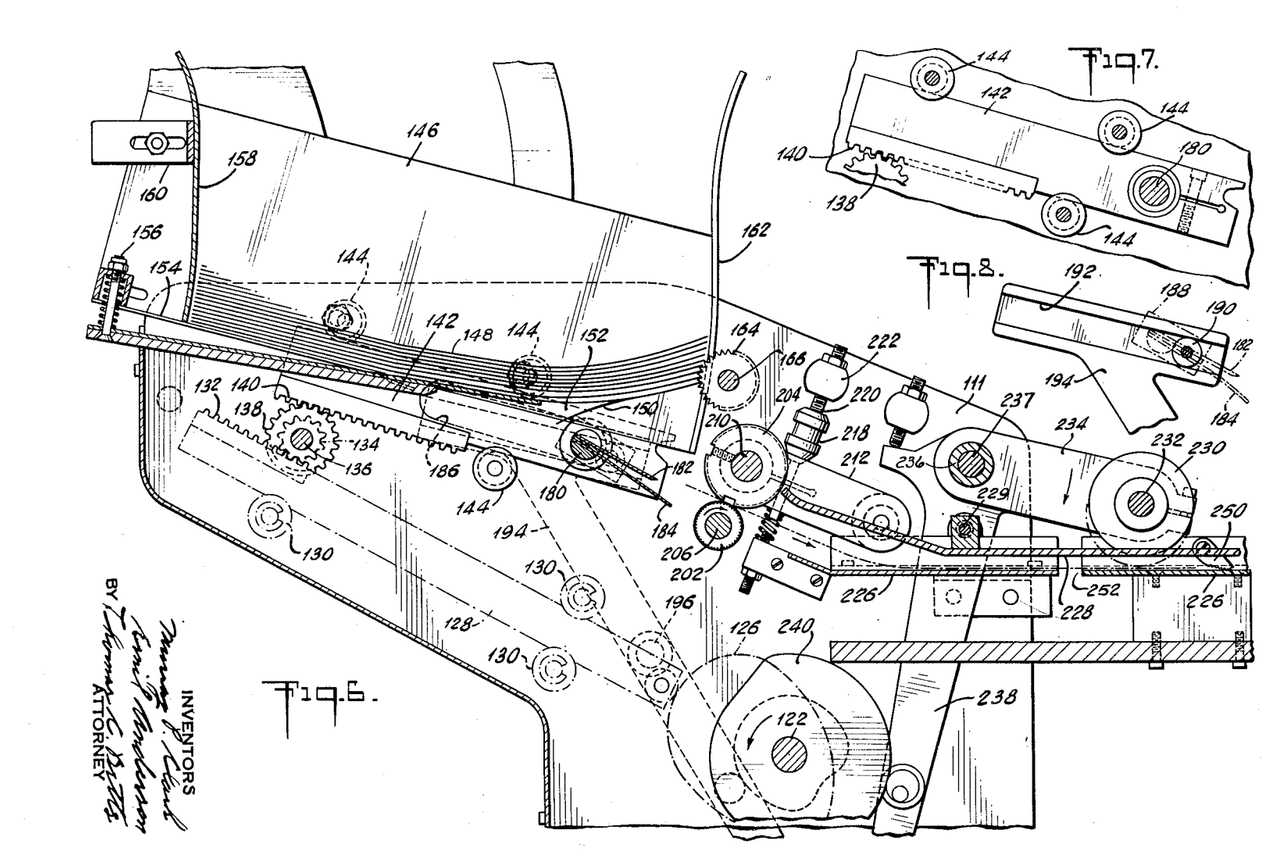
Fig. 6 is a cross-sectional view on an enlarged scale taken on the line 6—6 of Fig. 3.
Fig. 7 is a side view on an enlarged scale of a detail shown in Fig. 6.
Fig. 8 is a side view on an enlarged scale of another detail shown in Fig. 6.
Figure 9:
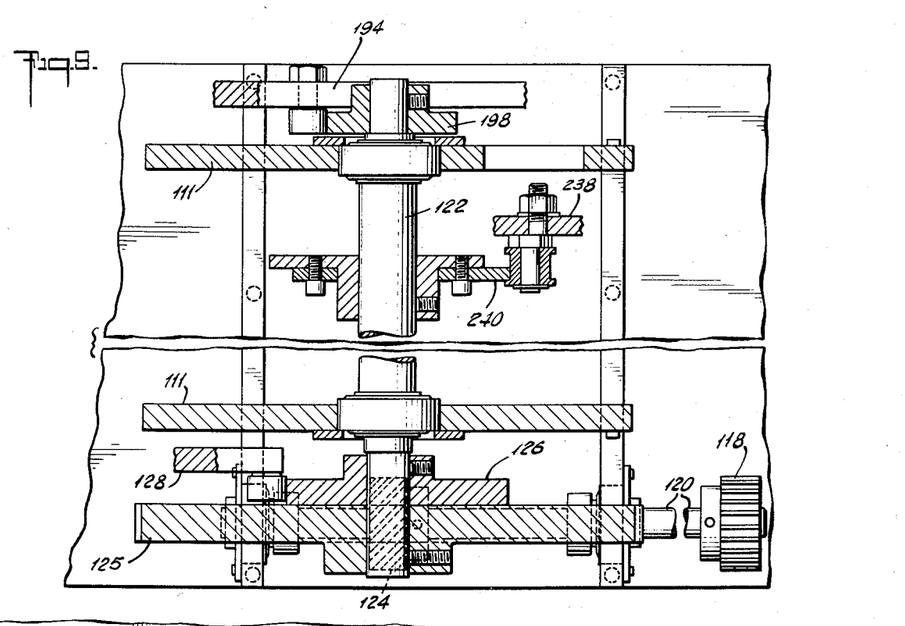
Fig. 9 is a cross-sectional view taken on the line 9—9 of Fig. 5.

Mounted on the shaft 122 is a cam 126 having a contour as shown in Figs. 5 and 6. This cam cooperates with a cam follower 128 so as to reciprocate the follower between guide rollers 130. The cam follower is urged against the cam by means of a pair of springs 131. The opposite end of the follower 128 is formed with rack teeth 132 which engage a pinion 134 mounted on a shaft 136. This shaft also carries a pinion 138 which engages rack teeth 140 formed on a bag feeding shuttle 142 which is reciprocated between guide rollers 144 (Figs. 5, 6, 7 and 12).

Figures 3, 4:
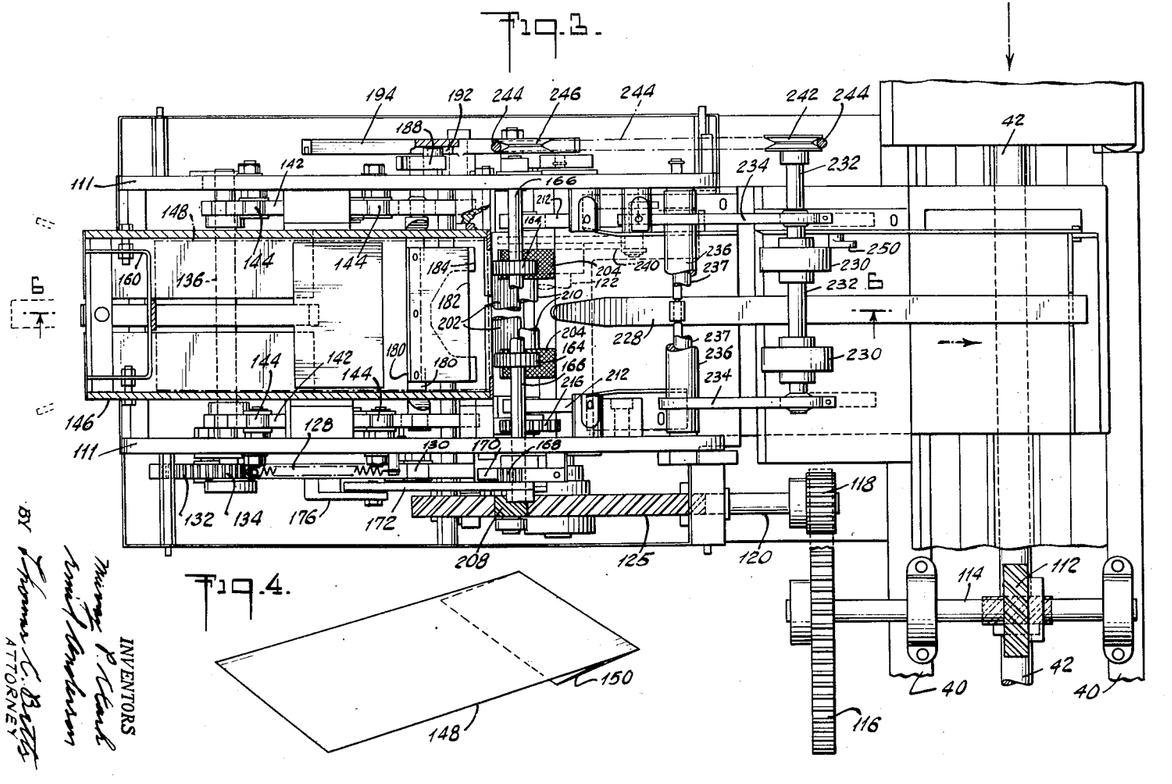
Fig. 3 is a cross-sectional view on an enlarged scale taken on the line 3—3 of Fig. 2a and shows the bag feeding portion of the apparatus.
Fig. 4 is a perspective view of a partially completed bag which is fed by the apparatus shown in Fig. 3.

Shuttle 142 is mounted for reciprocation beneath a bag hopper 146 in which is placed a stack of bags 148 of the type shown in Fig. 4. These bags have one end substantially closed by a flat end portion 150 which, when the bag is folded, lies parallel to the side walls of the bag. These bags are placed in the hopper 146 with their flat end portions down and at the right-hand end of the hopper as viewed in Figs. 5 and 6, and the length of the hopper is slightly less than that of the bags so that the right ends of the bags are bent upwardly, as is shown in Fig. 6. This results in the left-hand part of the flat end portion 150 of the lowermost bag being disposed at an angle with respect to the remainder of the bag, thus providing a V-shaped space 152. As shown particularly in Fig. 6, the left-hand portion of hopper 146 is provided with a bottom plate 154, the inclination of which may be varied by means of the adjusting nut 156 to provide the proper angle of the plate in order to cause the bags in the stack 148 to assume the position shown. Also, the rear wall 158 of the hopper may be adjusted forwardly or rearwardly by means of the slotted bracket 160 so as to provide the proper distance between this adjustable wall and the opposite fixed wall 162. This also permits the hopper to properly hold bags of different lengths.

Extending through slots formed in the forward wall 162 is a pair of toothed wheels 164 mounted on a shaft 166. Also carried by this shaft is a ratchet wheel 168 (Figs. 3 and 5) which is arranged to be stepped around counter-clockwise by means of a pawl 170 pivotally mounted on an arm 172, the right-hand end of which arm is pivoted on shaft 166. The other end of this arm is provided with a slot 174 which is engaged by a pin carried by an extension 176 rigidly secured to cam follower 128. Thus, as the extension 176 is moved back and forth by reciprocation of the cam follower, the pin in engagement with slot 174 causes the arm 172 to be rocked so that the pawl 170 rotates the ratchet wheel 168 one step in counter-clockwise direction for each return movement of the cam follower. A stop 178 is provided for preventing reverse movement of the ratchet wheel. As will be seen from Fig. 6 the toothed wheels 164, which are driven through the shaft 166 by the ratchet wheel, engage the forward ends of the bags near the bottom of the stack in the hopper 146, the arrangement being such that for each movement of the toothed wheels 164 the forward end of the lowermost bag is forced downwardly, while the remainder of the bags in the stack are held up, thus assuring that only one bag at a time is fed downwardly.

Figures 10, 11:
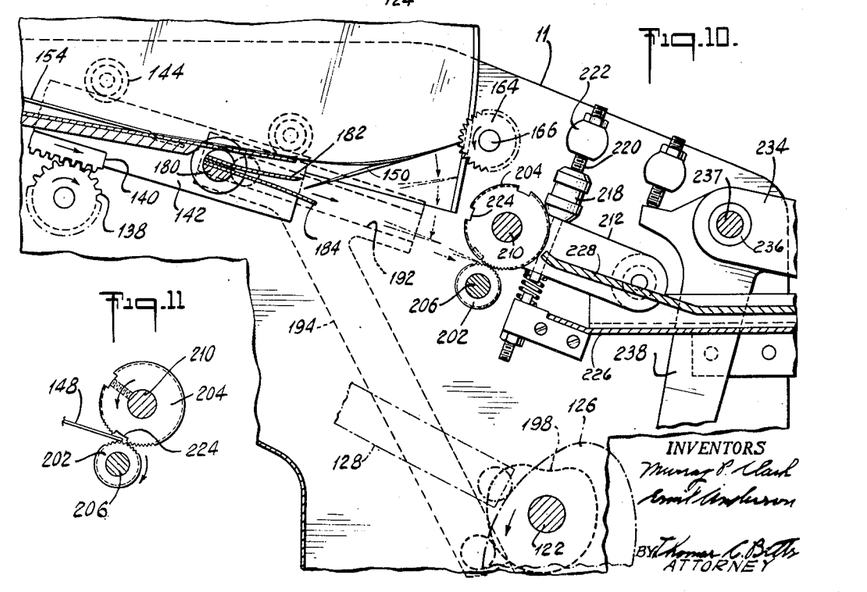
Fig. 10 is a cross-sectional view of a portion of the device shown in Fig. 6, but with certain parts in different positions.
Fig. 11 is a side view of a detail shown in Fig. 10.
Figure 12:
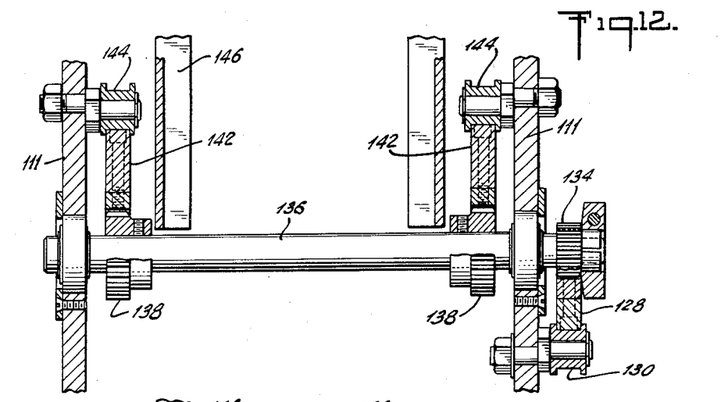
Fig. 12 is a cross-sectional view taken on the line 12—12 of Fig. 5.
Figure 13:
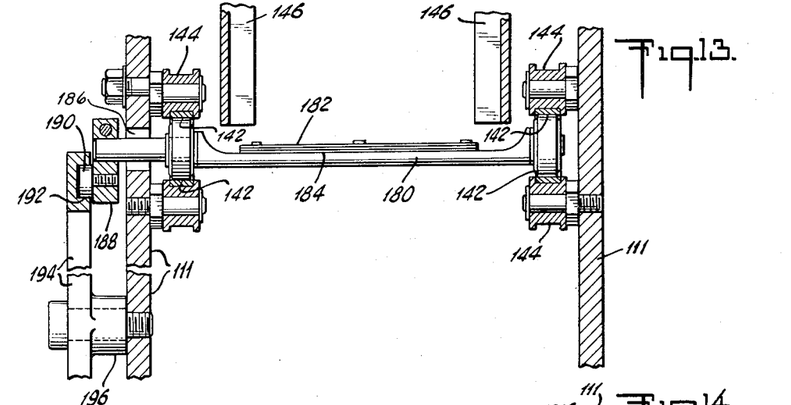
Fig. 13 is a cross-sectional view taken on the line 13—13 of Fig. 5.

Rotatably mounted on the shuttle 142 is a shaft 180 which has a flattened central portion to which is secured a pair of spaced blade-like members 182 and 184 (Figs. 6, 10 and 13). One end of shaft 180 extends through a slot 186 formed in the frame 111, as is shown in Fig. 13, and the outer end of the shaft is provided with a short crank 188. This crank carries a headed bolt 190 which engages within a slot 192 formed in a cam follower 194 which is pivotally mounted on the frame at 196. This cam follower cooperates with a cam 198 mounted on the cam shaft 122, a spring 200 (Fig. 5) being provided to hold the follower in contact with the cam. As the shaft 180 carrying the blades 182 and 184 is moved back and forth parallel to itself by the reciprocation of the shuttle 142 between the extreme position shown in Figs. 6 and 10, the cam follower 194 is rocked in timed relation to this reciprocating motion, and the rocking of the cam follower acting through the crank 188 causes the shaft 180 to oscillate slightly between the extreme positions shown again in Figs. 6 and 10. With the shuttle 142 in the retracted position shown in Fig. 10, the spaced blades 182 and 184 are in a position to engage the edge of the end portion 150 of the lowermost bag in the stack. As the shaft 180 and the blades are moved to the right by the reciprocation of the shuttle 142, the end portion 150 is engaged between the blades, and during this reciprocating motion the shaft 180 is rocked slightly in a clockwise direction so as to pull this end of the engaged bag downwardly and at the same time to move the bag to the right.

This movement of the bag introduces the opposite edge of the end portion 150 between an elongated roller 202 and a pair of rollers 204, each of these rollers having a serrated periphery. Roller 202 is formed on a shaft 206 mounted in suitable bearings in the frame 111 and carries a helical gear 208 meshing with gear 125. Rollers 204 are mounted on a shaft 210 carried by suitable bearings in a pair of pivoted arms 212. These arms are normally urged in a counter-clockwise direction, as viewed in Figs. 6 and 10 by means of adjustable collars 218 on threaded members 220, so as to maintain the spur gear 214 on shaft 206 in mesh with spur gear 216 on shaft 210. These threaded members are carried by compressible rubber blocks 222 which permit the arms 212 to pivot slightly in a clockwise direction in order to permit the passage of a bag between the rollers 202 and 204 and to accommodate the extra thickness of the bag at the end portion 150 while still causing the knurled rollers to grip the thinner portion of the bag behind the end portion. Each of the rollers 204 is formed with a recess 224 in its periphery so positioned that the forward edge of the bag as advanced by the shuttle from the hopper enters this recess, as shown in Fig. 11, so as to assure that the edge will be nipped between the rollers.

Disposed to the right of the rollers 202 and 204 is a bedplate 226 above the central portion of which is an upper guide strip 228, the left end of which is supported from a rod 229 carried by the frame. As is shown in Fig. 6, the left-hand portions of plate 226 and guide 228 diverge somewhat so as to receive the forward end of the bag as the latter is advanced by the rotation of the feed rollers 202 and 204.

Figure 14:
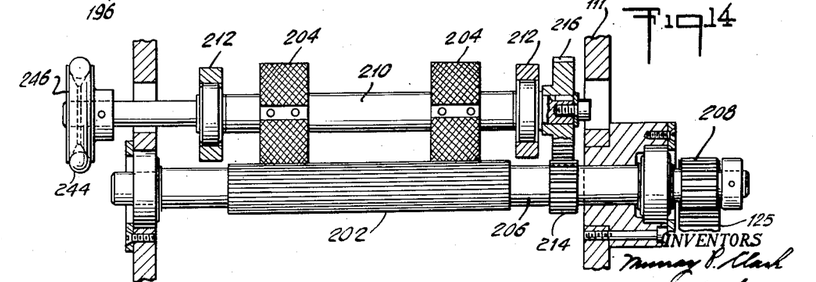
Fig. 14 is a cross-sectional view taken on the line 14—14 of Fig. 5.

Disposed above the bedplate 226 and straddling guide strip 228 is a pair of rollers 230 mounted on a shaft 232 which is carried at one end of a pair of levers 234 which are secured to a hollow shaft 236 rotatably carried by an inner shaft or rod 237 mounted in the frame 111. Also secured to hollow shaft 236, as by being integral with one of the levers 234, is a cam follower 238 which cooperates with a cam 240 mounted on the cam shaft 122. A spring 241 (Fig. 5) urges the follower 238 into contact with cam 240. Shaft 232 also carries a belt pulley 242 which is engaged by a belt 244 driven by a pulley 246 on shaft 210 (Figs. 3 and 14). As shown in Fig. 3, the diameter of rollers 230 is greater than that of rollers 204 on shaft 210 and consequently, inasmuch as the rotational speed of the rollers 230 is the same as that of the rollers 204, the pulleys 242 and 246 having the same diameter, the peripheral speed of the larger rollers 230 will be greater than that of the smaller rollers 204. The timing of the cams is such that cam 240 lifts rollers 230 out of engagement with the bedplate 226 as a bag is advanced thereunder by means of the rollers 202 and 204. When the bag has been advanced to underneath the rollers 230, the cam lowers these rollers into engagement with the upper surface with the bag and, inasmuch as these rollers have a greater peripheral speed as above explained, they move the bag with accelerated velocity over the bedplate 226 towards the right until the end of the bag strikes an abutment 248 on the far side of the main frame 40. During this advance, the bag passes underneath a pivoted member 250 having a serrated lower surface which counteracts any tendency of the bag to bounce back after striking abutment 248.

*Disc and bag combining mechanism*

As will be noted from Fig. 5, the bedplate 226 extends all the way across the main frame 40 to the abutment 248 and extends over the disc conveyer chains 54 and the disc guides 70. This bedplate is formed with slots 252 through which extend projections 254 on a pair of bag conveying chains 256. As is shown in Fig. 22, chains 256 run on sprockets 258 and 260, the latter being mounted on a shaft 262 which is driven by a chain and sprocket drive 264 having a one to one ratio from shaft 60. Hence, conveyer chains 54 and 256 travel at the same speed. The projections 254 on the bag conveyer chains 256 are located in advance of the projections 68 on the disc conveyer chains 54 by a distance which is equal to the distance which the disc 52 extends beyond the side of the bag portion 148, and the cam 240 is timed to lift the rollers 230 away from the bag just as or slightly before the bag strikes abutment 248 and before the bag is engaged by the projections 254 on the bag conveyer chains.

Figure 26:
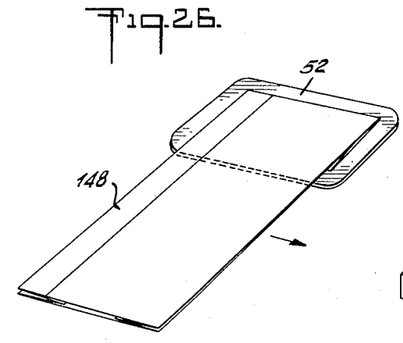
Fig. 26 is a perspective view showing the bag and disc after they have been glued together to form a dust container.

Inasmuch as the disc conveyer chains and the bag conveyer chains are both driven at the same speed, a disc and bag are then advanced in register lengthwise of the main frame 40, the bag and disc being first separated from each other by the bedplate 226 which has an extension 227 extending lengthwise of the main frame 40 over the disc conveyer chains, the bag being above the bedplate while the disc is below it. When the disc reaches the right-hand end of the extension 227 of the bedplate, as viewed in Fig. 1a, the end portion 150 of the bag comes into contact with the disc 52, the upper surface of which has had applied thereto the glue line 82, as previously described. The chains 54 and 256, continue to advance the disc and superimposed bag until the latter pass between belts 266 and 268 carried by an upper set of four pressure rollers 270 and a lower set 272, respectively (Figs. 1a, 2a and 22). As is shown in Fig. 22, one roller of the lower set is driven by shaft 274 through a chain and sprocket drive 276 having a one to one ratio from shaft 64, while one roller of the upper set is driven by shaft 278 from shaft 274 by means of a pair of equal diameter pinions 280. Consequently, the belts 266 and 268 travel at the same speed as the conveyer chains 54 and 256. During passage of the bag and disc between the belts carried by these pressure rollers, the bag and disc are pressed together to cause the glue 82 on the disc to adhere to the bag and when discharged from between the belts the two are glued securely together. Tensioning rollers, such as roller 282 shown in Figs. 1a and 2a, may be provided for maintaining the belts 266 and 268 tight around the upper and lower sets of rollers. When the container is discharged from the pressure rollers it is in the condition shown in Fig. 26, namely with the end portion 150 of the bag 148 glued to the disc 52, as above described, and with the opposite end of the bag portion open.

*Bag end closing mechanism*

It is now necessary to fold over and glue the latter end of the bag in order to close it. This operation is performed on the portion of the machine shown in Figs. 1b and 2b and in greater detail in Figs. 18 through 21. During the folding over and gluing operations, the bag and disc are advanced between belts 284 and 286 running around an upper set of rollers 288 and a lower set 290, respectively. Due to the lengths of the belts 284 and 286 and the consequent large number of rollers in each set, it is preferable that both end rollers of each set be power driven. Consequently, the right-hand roller of the lower set is provided with a shaft 292 which is driven by a chain and sprocket drive 294 from a shaft 296 which in turn is driven through the screw gears 298 from the line shaft 42. The right-hand roller in the upper set is provided with a shaft 300 which is driven from shaft 292 by means of spur gears 302. The left-hand roller in the lower set is provided with a shaft 304 driven by a chain and sprocket drive 306 from a shaft 308 which is driven through screw gears 310 from the line shaft 42. The left-hand roller in the upper set is provided with a shaft 312 driven through the spur gears 314 from the shaft 304. Tensioning rollers 285 and 287 may be provided to maintain the belts tight.

Figure 1B:
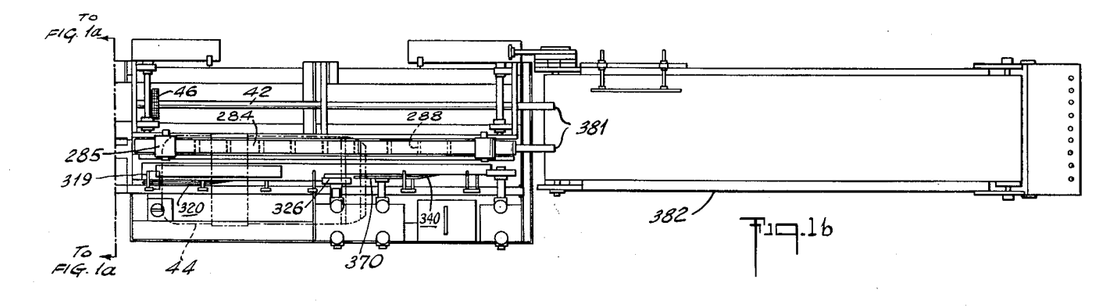
Figure 19:
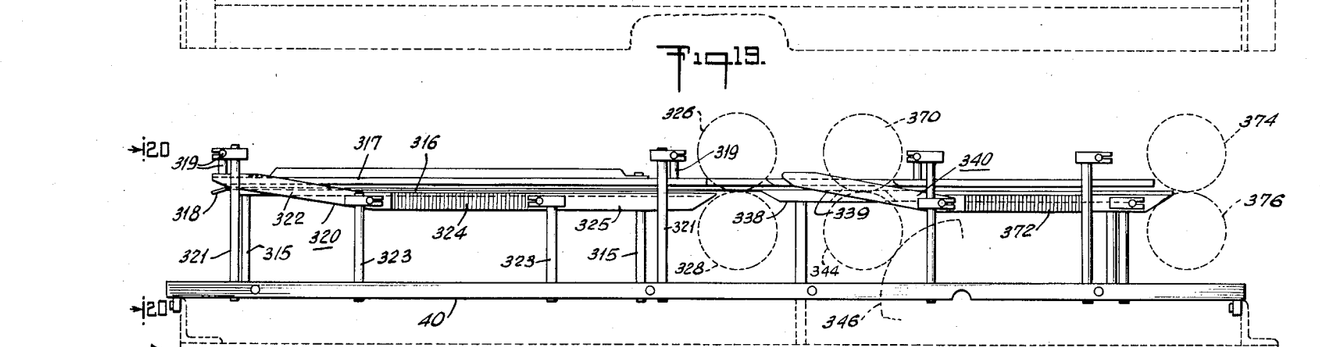
Fig. 19 is a side view of the apparatus shown in Fig. 18.
Figure 20:
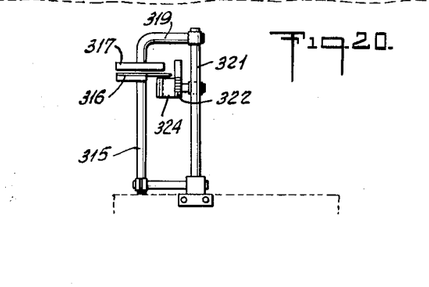
Fig. 20 is an end view of the apparatus shown in Fig. 19 looking in the direction of the arrows 20—20.
Figure 21:
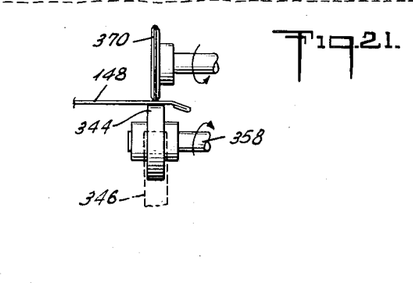
Fig. 21 is a view of a detail shown in Fig. 19.
Figure 27:
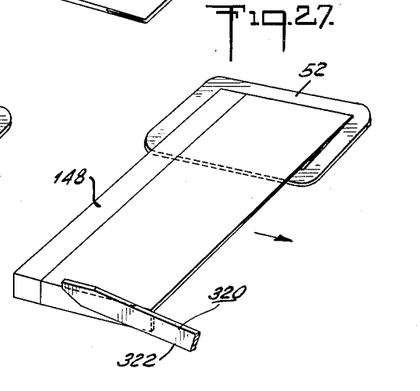
Fig. 27 is a perspective view showing the container at the beginning of the folding operation for closing the end of the bag.

As is shown in Fig. 1b, the belts 284 and 286 are disposed near the front of frame 40 so as to engage the bag between the disc and the open end of the bag, the portion of the bag adjacent the open end thereof thus extending outwardly from the belts towards the front of the frame. Supported from the frame 40 by upright members 315 at a suitable level so as to be immediately below the extending end of the bag is a guide rail 316, the left-hand end of which as viewed in Fig. 19 is flared downward, as is shown at 318 in order to assure that the advancing bag will slide along the upper surface of the guide. Spaced above rail 316 a distance sufficient to accommodate a folded bag is a plate member 317 supported by arms 319 carried by uprights 321. Supported outwardly on the guide rail 316 by uprights 323 is a turning guide rail 320. As is shown in Fig. 19 the lower surface of the left-hand portion 322 of this guide rail slopes downwardly and to the right, the left-hand end of the rail being above the downwardly flared end 318 of guide rail 316. Thus, as a bag is advanced by the belts 284 and 286, the outer end of it passes between the guide rail 316 and the plate 317 and below the left-hand end of guide rail 320, and the lower inclined surface of portion 322 of guide rail 320 causes the bag to be folded downwardly around the edge of rail 316 until it is folded at right angles to the remainder of the bag portion, as is shown in Fig. 27.

The downward inclination of the left-hand portion 322 of rail 320 brings its upper edge below the lower surface of guide rail 316 and the central portion of rail 320 extends inwardly, as is shown at 324 in Figs. 18, 19, 20 and 28 so as to extend underneath rail 316. This causes the downwardly turned end of the bag to be folded through an additional 90° around the edge of rail 316, to the position shown in Fig. 28. The right-hand portion 325 of rail 320 extends parallel to and beneath rail 316 and during the passage of the bag through this portion of the machine, no further folding takes place.

As the bag leaves the rails 316 and 320, the outer folded end thereof passes between a pair of creasing rollers 326 and 328 which apply substantial pressure to the folded end of the bag so as to form a permanent crease. As shown in Fig. 22, creasing roller 328 is mounted on a shaft 330 driven from a shaft 332 by a chain and sprocket drive 334, shaft 332 in turn being driven by a chain and sprocket drive 336 from shaft 308. The upper creasing roller 326 is not positively driven, but is rotated by the linear movement of the bag between its periphery and the periphery of roller 328. This roller is mounted on a shaft 327 journaled in a bearing block 329 which may be adjusted vertically to regulate the pressure applied by the creasing rollers.

Figures 28, 29:
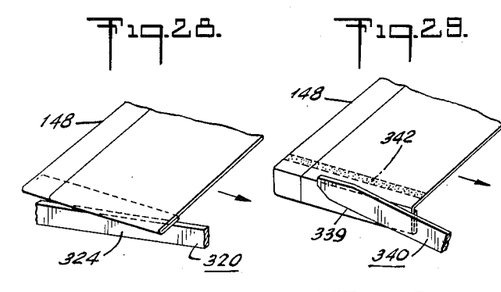
Fig. 28 is a perspective view showing the container after one fold has been completed.
Fig. 29 is a perspective view showing the container at the beginning of the second fold and after adhesive has been applied thereto.

When the creased bag leaves the creasing rollers 326 and 328 it passes above a straight horizontal guide rail 338 and beneath the downwardly inclined left-hand portion 339 of a guide rail 340. These guide rails correspond to guide rails 316 and 320, respectively, except that they are set closer to the edges of the belts 284 and 286 a distance which is equal to the shortening of the bag resulting from the first fold over. As the second fold over is being effected by the downwardly inclined left-hand portion 339 of rail 340, a glue line 342, shown in Fig. 29, is applied to the lower surface of the bag by means of a glue printing roller 344 (Figs. 18, 19, 21 and 22) to the surface of which glue is applied by means of the transfer roller 346 which rotates in a glue reservoir 348, as shown in Fig. 22. Glue printing roller 344 is mounted on a shaft 350 driven through a chain and sprocket drive 352 from a shaft 354 which in turn is driven by a chain and sprocket drive 356 from shaft 332. Transfer roller 346 is mounted on a shaft 358 connected by a chain and sprocket drive 360 with a shaft 362 which is driven from a shaft 364 by means of the meshing pinions 366 which have a two to one gear ratio. Shaft 364 is driven by a chain and sprocket drive 368 from shaft 296. Transfer roller 346 has twice the diameter as printing roller 344, but by virtue of the two to one ratio of the pinions 366, the peripheral speeds of these two rollers are the same. A guide or hold down roller 370 is disposed above printing roller 344 so as to hold the bag in contact with the printing roller. Roller 370 need not be driven, but is free to be rotated by the passage of the bag in contact therewith.

Figure 30:
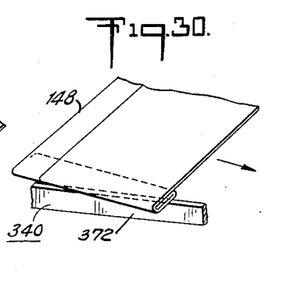
Fig. 30 is a perspective view showing the container after the second fold has been completed.
Figure 31:
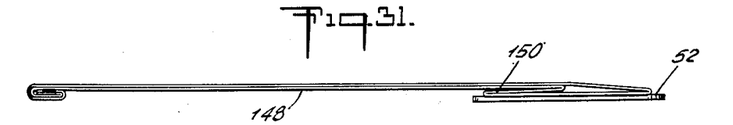
Fig. 31 is a side view of a completed dust container.

After the end of the bag had been folded to the position shown in Fig. 29 it is further folded inwardly to the position shown in Fig. 30 by means of the inwardly extending portion 372 of the guide rail 340. This brings the fold in contact with the glue line 342 and the bag is then passed between a pair of pressure rollers 374 and 376. As shown in Fig. 22, roller 376 is mounted on a shaft 378 driven by a chain and sprocket drive 380 from shaft 364. Pressure roller 374 is not positively driven but is free to be rotated by the movement of the bag in contact with its periphery. Passage of the bag between these two pressure rollers forces the glued surfaces together and assures the formation of a tight glued joint. The hold down roller 370 and the pressure roller 374 are each mounted on shafts journaled in vertically adjustable bearing blocks 371 and 375, respectively, similar to bearing block 329, as is shown in Fig. 2b. A completed container with the double fold over for closing the end of the bag portion 148 is shown in Fig. 31.

The pressure rollers 374 and 376 are located at the right-hand end of belts 284 and 286 and consequently the bags are discharged from between the belts and from between the pressure rollers at the same time onto inclined rails 381 down which they slide by gravity onto a surface 382. This may be a table from which an operator picks up the bags by hand and packs them in suitable cartons or the like, or it may be a conveyer belt which slowly moves the bags to the right, as viewed in Figs. 1b and 2b, so that they will not accumulate at the point where they are discharged from the rails 381.

While there has been described one more or less specific embodiment of the invention, it is to be understood that this has been done for illustration only and that the scope of the invention is not to be limited thereby, but is to be determined from the appended claims.

What we claim is:

1. In an apparatus for manufacturing vacuum cleaner dust containers, a first conveyer for moving cardboard discs in succession, an adhesive printing roller rotatably mounted adjacent to said conveyer, means for driving said conveyer and roller in timed relation so that the latter applies adhesive to each successive disc, a second conveyer disposed parallel to said first conveyer for moving partially formed bags in succession, means for driving said conveyers in timed relation so that a bag is moved along in registry with a disc, pressure rollers disposed at the end of said conveyers for receiving therebetween a registered disc and bag to press them together to cause said adhesive to secure the bag to the disc, means for driving said rollers at a peripheral speed at least as great as the linear speed of said conveyers, means disposed beyond said rollers for continuing the movement of said bags and discs, and means adjacent to the last mentioned means for applying adhesive to and folding over an end of each bag to effect a closure thereof.

2. In an apparatus for manufacturing vacuum cleaner dust containers, a first conveyer for moving cardboard discs in succession, an adhesive printing roller rotatably mounted adjacent to said conveyer, means for driving said conveyer and roller in timed relation so that the latter applies adhesive to each successive disc, a second conveyer disposed parallel and to one side of said first conveyer for engaging a side edge of a partially formed elongated bag, means for driving said conveyers in timed relation so that a bag is moved sideways with one end in registry with a disc, pressure rollers disposed at the end of said conveyers for receiving therebetween a registered disc and bag to apply pressure thereto to cause said adhesive to secure the bag to the disc, means for driving said rollers at a peripheral speed at least as great as the linear speed of said conveyers, means disposed beyond said rollers for continuing the sideways movement of said bags and discs, a glue roller disposed beside the last mentioned means for applying a band of adhesive across each bag adjacent to the opposite end of the bag, and stationary guide means disposed in the path of travel of said opposite end for folding over said opposite end against said band of adhesive to effect a closure of each bag.

3. In an apparatus for manufacturing vacuum cleaner dust containers, means for conveying cardboard discs in one direction along a path, means disposed along said path for applying adhesive to a surface of each disc, means for feeding partially formed bags lengthwise in a direction at right angles to and intersecting said path beyond said applying means, means operative at the point of intersection to change the direction of movement of said bags and to convey said bags sideways in the first mentioned direction along the remaining portion of said path with a folded over flat end portion of each bag in registry with a disc, means disposed along said portion of said path for pressing each registered bag and disc together to cause said adhesive to secure the bag to the disc, and means disposed further along said portion of said path for applying adhesive to and folding over the opposite end of each bag for effecting a closure thereof.

4. In an apparatus for manufacturing vacuum cleaner dust containers, a first conveyer for moving cardboard discs in succession, an adhesive printing roller rotatably mounted adjacent to said conveyer, means for driving said conveyer and roller in timed relation so that the latter applies adhesive to each successive disc, means for feeding partially formed bags in a direction at right angles to and intersecting the path of movement of said discs, a second conveyer disposed parallel to said first conveyer for engaging and changing the direction of movement of said bags, means for driving said conveyers in timed relation so that a bag is moved along with a folded over portion thereof in registry with a disc, pressure rollers disposed at the end of said conveyer for receiving therebetween a registered disc and bag to press them together to cause said adhesive to secure the bag to the disc, means for driving said rollers at a peripheral speed at least as great as the linear speed of said conveyers, means disposed beyond said rollers for continuing the movement of said bags and discs, and means adjacent to the last mentioned means for applying adhesive to and folding over the opposite end of each bag to effect a closure thereof.

5. In an apparatus for manufacturing vacuum cleaner dust containers, means for storing a stack of discs, means for removing one disc at a time from said stack, means for conveying the removed discs in spaced relation to each other along a path, means disposed along said patch for applying adhesive to a surface of each disc, means for feeding partially formed elongated bags lengthwise in a direction at right angles to and intersecting said path, means for changing the direction of movement of said bags and conveying them sideways along said path with a folded over flat end portion of each bag in registry with a disc, means disposed along said path for pressing each registered bag and disc together to cause said adhesive to secure the bag to the disc, means disposed further along said path for applying a band of adhesive across each bag adjacent to the opposite end of the bag, and stationary guide means disposed in the path of travel of said opposite end for folding over said opposite end against said band of adhesive for effecting a closure of each bag.

6. In an apparatus for manufacturing vacuum cleaner dust containers, means for conveying cardboard discs in one direction along a path, means disposed along said path for applying adhesive to a surface of each disc, a supporting surface disposed in closely spaced relation above said path beyond said applying means for supporting a partially formed bag thereon out of contact with the discs moving thereunder along said path, means for removing a partially formed bag from said surface and conveying it sideways in said direction along said path with a folded over flat end portion thereof in registry with a disc, means disposed therebeyond along said path for pressing each registered disc and bag together to cause said adhesive to secure to bag to the disc, and means disposed further along said path for applying adhesive to and folding over the opposite end of the bag for effecting a closure thereof.

7. In an apparatus for manufacturing vacuum cleaner dust containers, a first conveyer for moving cardboard discs in succession, an adhesive printing roller rotatably mounted adjacent to said conveyer, means for driving said conveyer and roller in timed relation so that the latter applies adhesive to each successive disc, a supporting surface disposed above said first conveyer beyond said applying means, a second conveyer disposed parallel to said first conveyer and extending underneath said surface for removing partially formed bags from said surface and conveying them in succession, means for driving said conveyers in timed relation so that a bag is moved along in registry with a disc, pressure rollers disposed at the end of said conveyers for receiving therebetween a registered bag and disc to press them together to cause said adhesive to secure to bag to the disc, means for driving said rollers at a peripheral speed at least as great as the linear speed of said conveyers, means disposed beyond said rollers for continuing the movement of said bags and discs, and means adjacent to the last mentioned means for applying adhesive to and folding over an end of each bag to effect a closure thereof.

8. In an apparatus for manufacturing vacuum cleaner dust containers, a first conveyer for moving cardboard discs in succession, an adhesive printing roller rotatably mounted adjacent to said conveyer, means for driving said conveyer and roller in timed relation so that the latter applies adhesive to each successive disc, a supporting surface disposed above first conveyer, a second conveyer disposed parallel and to one side of said first conveyer and extending underneath said surface for engaging a side edge of a partially formed bag resting on said surface, means for driving said conveyers in timed relation so that a bag is moved sideways with one end in registry with a disc, pressure rollers disposed at the end of said conveyers for receiving therebetween a registered disc and bag to apply pressure thereto to cause said adhesive to secure the bag to the disc, means for driving said rollers at a peripheral speed at least as great as the linear speed of said conveyer, means disposed beyond said rollers for continuing the sideways movement of said bags and discs, a glue roller disposed beside the last mentioned means for applying a band of adhesive across each bag adjacent to the opposite end of the bag, and stationary guide means disposed in the path of travel of said opposite end for folding over said opposite end against said band of adhesive to effect a closure of each bag.

9. In an apparatus for manufacturing vacuum cleaner dust containers, means for conveying cardboard discs in one direction along a path, means disposed along said path for applying adhesive to a surface of each disc, a supporting surface disposed above said path beyond said applying means, means for feeding a partially formed bag lengthwise in a direction normal to said path onto said surface, means for removing the bag from said surface and conveying it sideways in the first mentioned direction along said path with a folded over flat portion thereof in registry with a disc, means disposed therebeyond along said path for pressing each registered disc and bag together to cause said adhesive to secure the bag to the disc, and means disposed further along said path for applying adhesive to and folding over the opposite end of the bag for effecting a closure thereof.

10. In an apparatus for manufacturing vacuum cleaner dust containers, means for storing a stack of discs, means for removing one disc at a time from said stack, means for conveying the removed discs in spaced relation to each other along a path, means disposed along said path for applying adhesive to a surface of each disc, a supporting surface disposed above said path beyond said applying means, means for feeding partially formed elongated bags lengthwise in a direction normal to said path onto said surface, means for removing said bags from said surface and conveying them sideways along said path with a folded over flat end portion of each bag in registry with a disc, means disposed along said path for pressing each registered bag and disc together to cause said adhesive to secure the bag to the disc, means disposed further along said path for applying a band of adhesive laterally across each bag adjacent to the opposite end of the bag, and stationary guide means disposed in the path of travel of said opposite end for folding over said opposite end against said band of adhesive for effecting a closure of each bag.

11. In an apparatus for manufacturing vacuum cleaner dust containers, a first conveyer for moving cardboard discs in succession, an adhesive printing roller rotatably mounted adjacent to said conveyer, means for driving said conveyer and roller in timed relation so that the latter applies adhesive to each successive disc, a supporting surface disposed above said first conveyer, means for feeding partially formed elongated bags lengthwise in a direction normal to the direction of travel of said conveyer onto said surface, a second conveyer disposed parallel and to one side of said first conveyer and extending underneath said surface for engaging a side edge of a bag resting on said surface, means for driving said conveyers in timed relation so that a bag is moved sideways with one end in registry with a disc, pressure roller disposed at the end of said conveyers for receiving therebetween a registered disc and bag to apply pressure thereto to cause said adhesive to secure the bag to the disc, means disposed beyond said rollers for continuing the sideways movement of said bags and discs, a glue roller disposed beside the last mentioned means for applying a band of adhesive across each bag adjacent to the opposite end of the bag, and stationary guide means disposed in the path of travel of said opposite end for folding over said opposite end against said band of adhesive to effect a closure of said bag.

12. That improvement in the method of fabricating vacuum cleaner dust containers which includes the steps of moving cardboard discs one after another in one direction along a path, passing said discs in contact with a glue applicator to apply adhesive to a surface of each disc, moving partially completed elongated bags in a direction at right angles to and intersecting said path of travel, changing the direction of movement of said bags where they intersect said path and thereafter moving said bags sideways in said first mentioned direction along said path with a folded over end portion of a bag superimposed on said surface of each disc, pressing each moving bag and disc together to cause them to be joined by said adhesive, passing said bags in contact with a glue applicator to apply a band of adhesive across each bag adjacent to its opposite end, and folding over said opposite end against the band of adhesive to effect a closure of the bag.

13. In an apparatus for manufacturing vacuum cleaner dust containers, a first conveyer for moving cardboard discs in succession, an adhesive printing roller rotatably mounted adjacent to said conveyer, means for driving said conveyer and roller in timed relation so that the latter applies adhesive to each successive disc, a supporting surface disposed above said conveyer, a second conveyer disposed parallel to said first conveyer and having means extending above said surface for removing partially formed bags from said surface and moving them in succession, means for driving said conveyers in timed relation so that a bag is moved along in registry with a disc, pressure rollers disposed at the end of said conveyers for receiving therebetween a registered disc and bag to press them together to cause said adhesive to secure the bag to the disc, means for driving said rollers at a peripheral speed at least as great as the linear speed of said conveyers, means disposed beyond said rollers for continuing the movement of said bags and discs, and means adjacent to the last mentioned means for applying adhesive to and folding over an end of each bag to effect a closure thereof.

14. That improvement in the method of fabricating vacuum cleaner dust containers which includes the steps of moving cardboard discs one after another in one direction along a path, applying adhesive to a surface of each disc, moving partially completed elongated bags in a direction at an angle to and intersecting said path, changing the direction of movement of said bags where they intersect said path and thereafter moving said bags along said path in said first mentioned direction with a folded over end portion of a bag superimposed on said surface of each disc, pressing each moving bag and disc together to cause them to be joined by said adhesive, applying adhesive to each bag adjacent to its opposite end, and folding over said opposite end against said adhesive to effect a closure of the bag.

References Cited in the file of this patent
UNITED STATES PATENTS

| Number | Name | Date |
|---|---|---|
| 714,386 | Matteson | Nov. 25, 1902 |
| 2,074,886 | Bergstein | Mar. 23, 1937 |
| 2,231,051 | Bischoff | Feb. 11, 1941 |